April 26, 1966  R. E. BLEWITT, JR., ET AL  3,248,109
INDEXING DISTRIBUTOR CONVEYOR WITH CONTROL
MEANS FOR PROGRAMMING SEQUENTIAL DELIVERY
OF PINS THEREFROM RELATIVE TO
CONVEYOR INDEXING Filed May 18, 1962  11 Sheets-Sheet 1

INVENTORS
ROY E. BLEWITT, JR.
JAMES D. ELLIOTT
BY

ATTORNEY

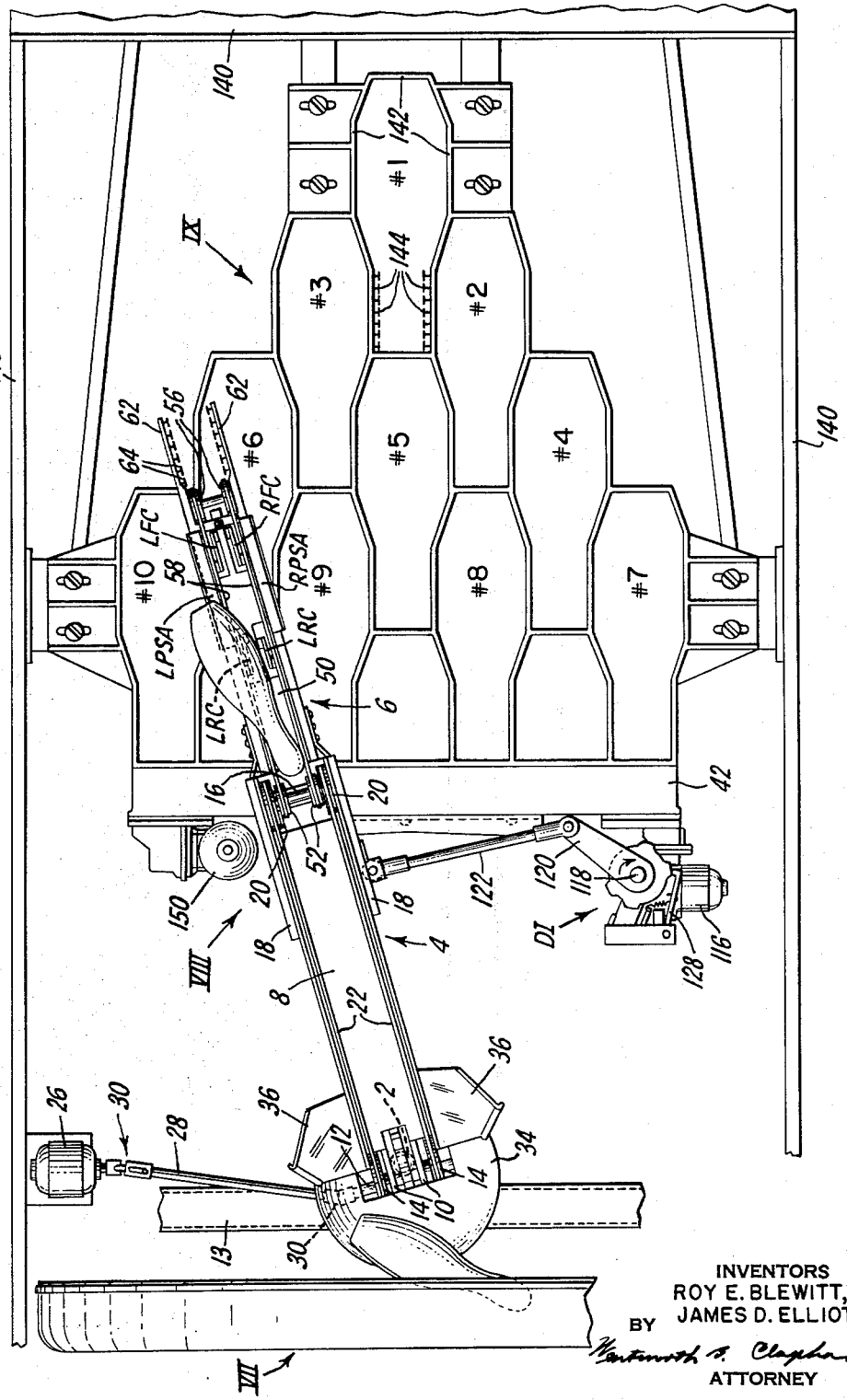

April 26, 1966    R. E. BLEWITT, JR., ET AL    3,248,109
INDEXING DISTRIBUTOR CONVEYOR WITH CONTROL
MEANS FOR PROGRAMMING SEQUENTIAL DELIVERY
OF PINS THEREFROM RELATIVE TO
CONVEYOR INDEXING Filed May 18, 1962    11 Sheets-Sheet 3

INVENTORS
ROY E. BLEWITT, JR.
JAMES D. ELLIOTT
BY
ATTORNEY

April 26, 1966  R. E. BLEWITT, JR., ET AL  3,248,109
INDEXING DISTRIBUTOR CONVEYOR WITH CONTROL
MEANS FOR PROGRAMMING SEQUENTIAL DELIVERY
OF PINS THEREFROM RELATIVE TO
CONVEYOR INDEXING
Filed May 18, 1962  11 Sheets-Sheet 4
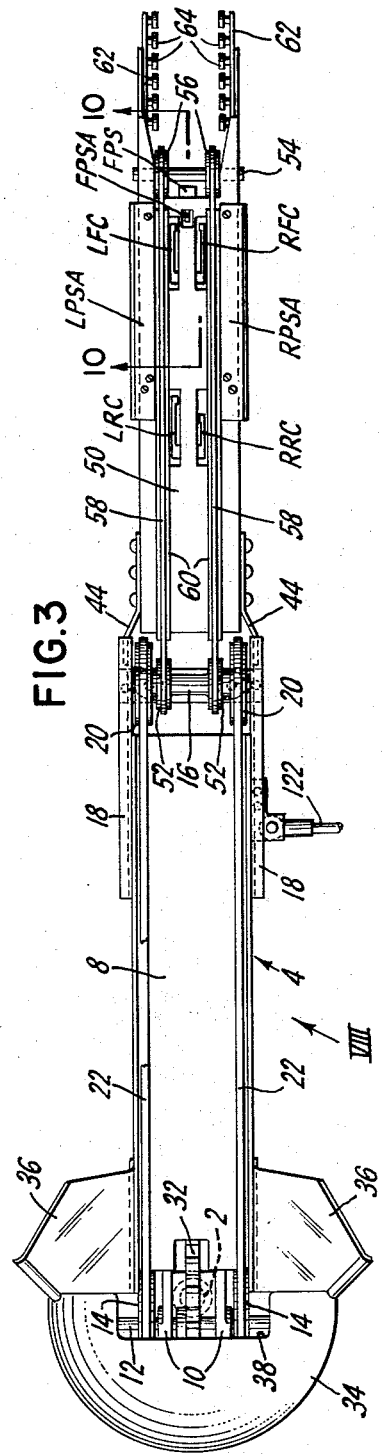
INVENTORS
ROY E. BLEWITT, JR.
JAMES D. ELLIOTT
BY
ATTORNEY

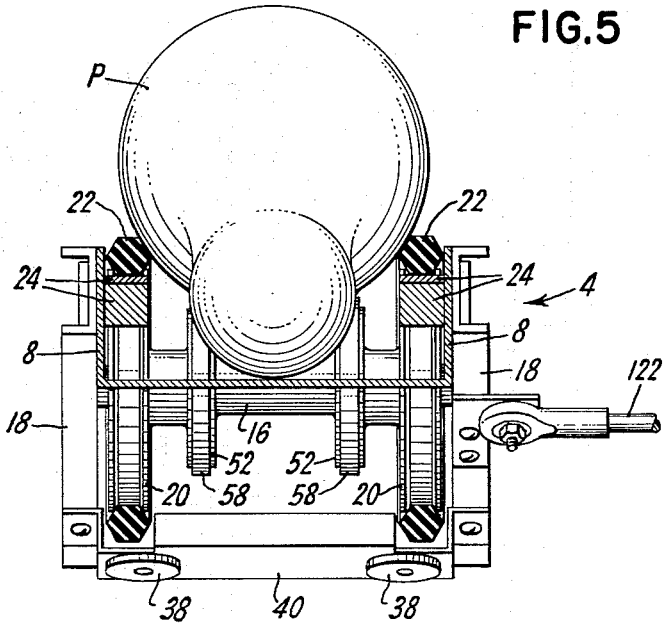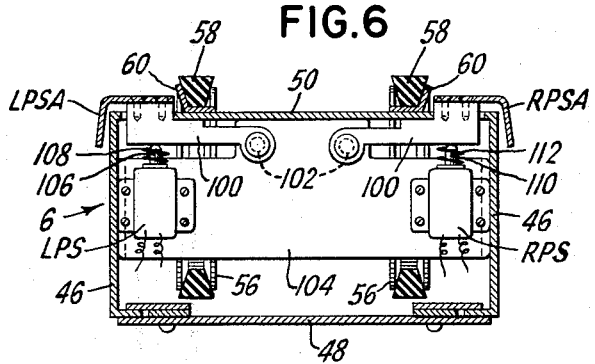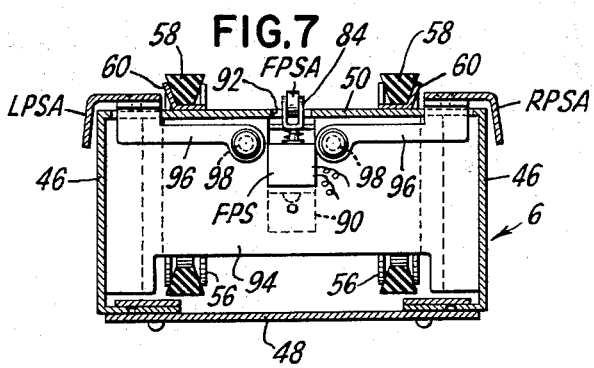

April 26, 1966   R. E. BLEWITT, JR., ET AL   3,248,109
INDEXING DISTRIBUTOR CONVEYOR WITH CONTROL
MEANS FOR PROGRAMMING SEQUENTIAL DELIVERY
OF PINS THEREFROM RELATIVE TO
CONVEYOR INDEXING
Filed May 18, 1962   11 Sheets-Sheet 6

INVENTORS
ROY E. BLEWITT, JR.
JAMES D. ELLIOTT
BY
ATTORNEY

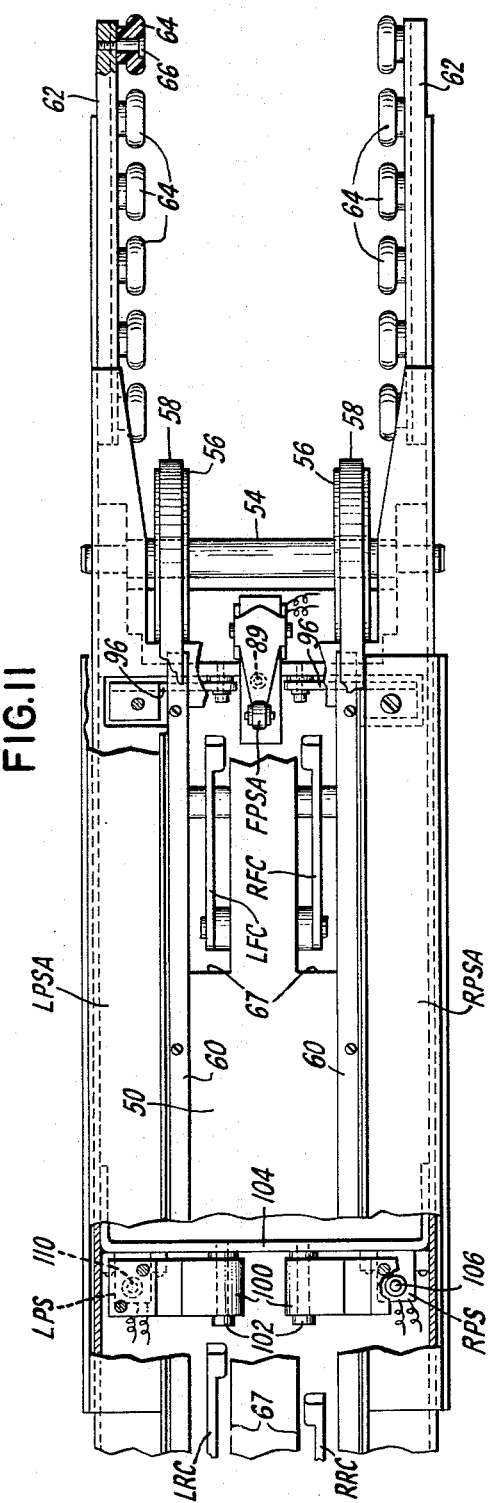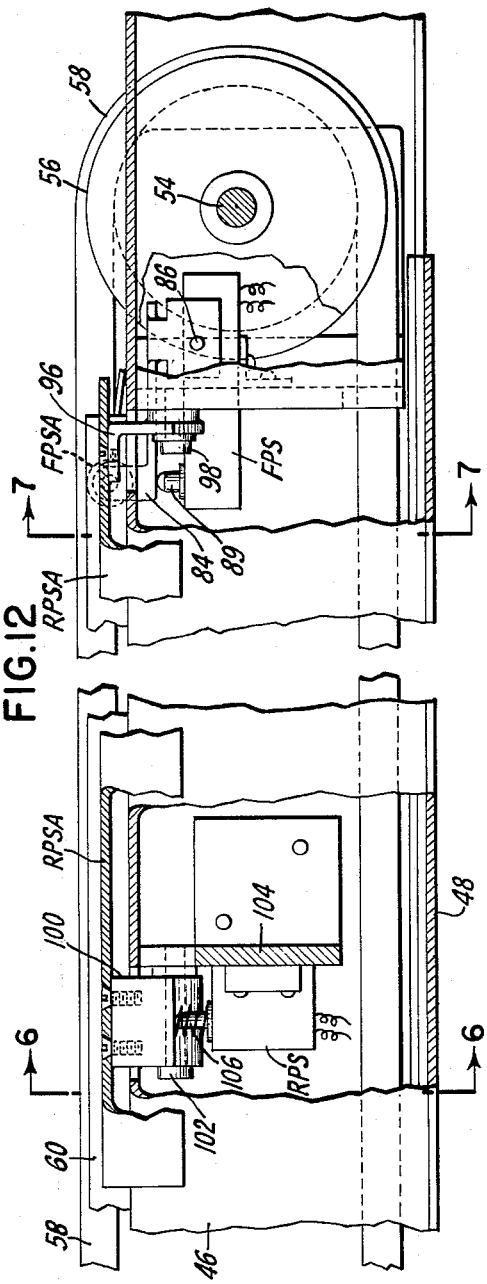

April 26, 1966  R. E. BLEWITT, JR., ET AL  3,248,109
INDEXING DISTRIBUTOR CONVEYOR WITH CONTROL
MEANS FOR PROGRAMMING SEQUENTIAL DELIVERY
OF PINS THEREFROM RELATIVE TO
CONVEYOR INDEXING
Filed May 18, 1962  11 Sheets-Sheet 8
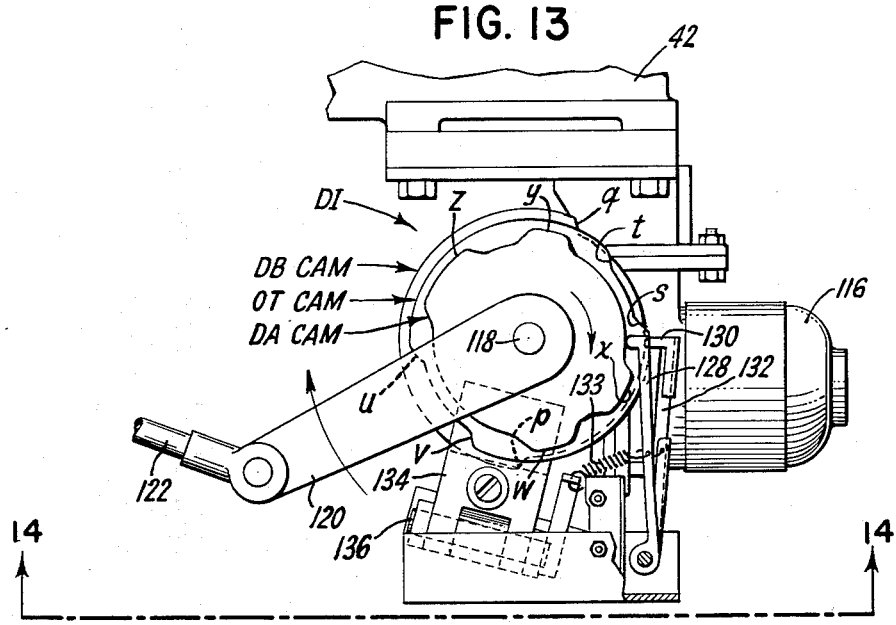
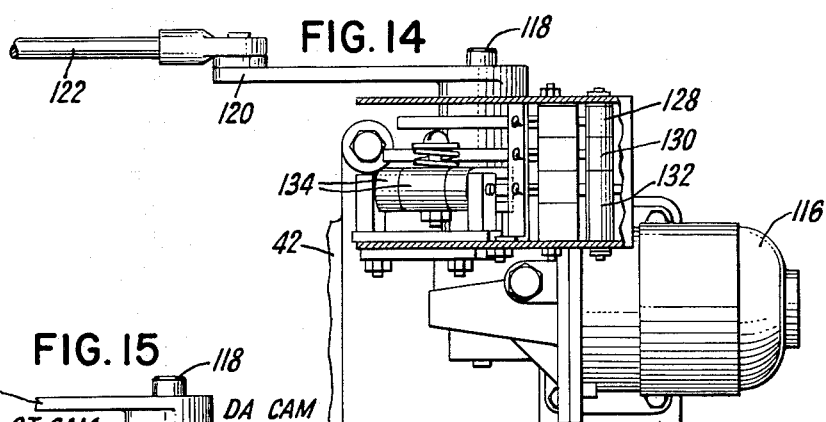
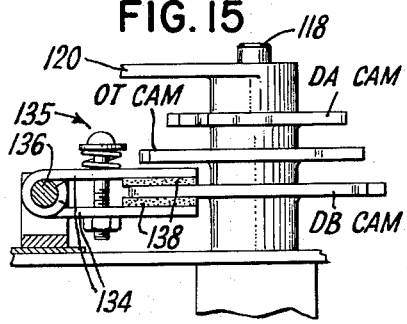
INVENTORS
ROY E. BLEWITT, JR.
JAMES D. ELLIOTT
BY
ATTORNEY

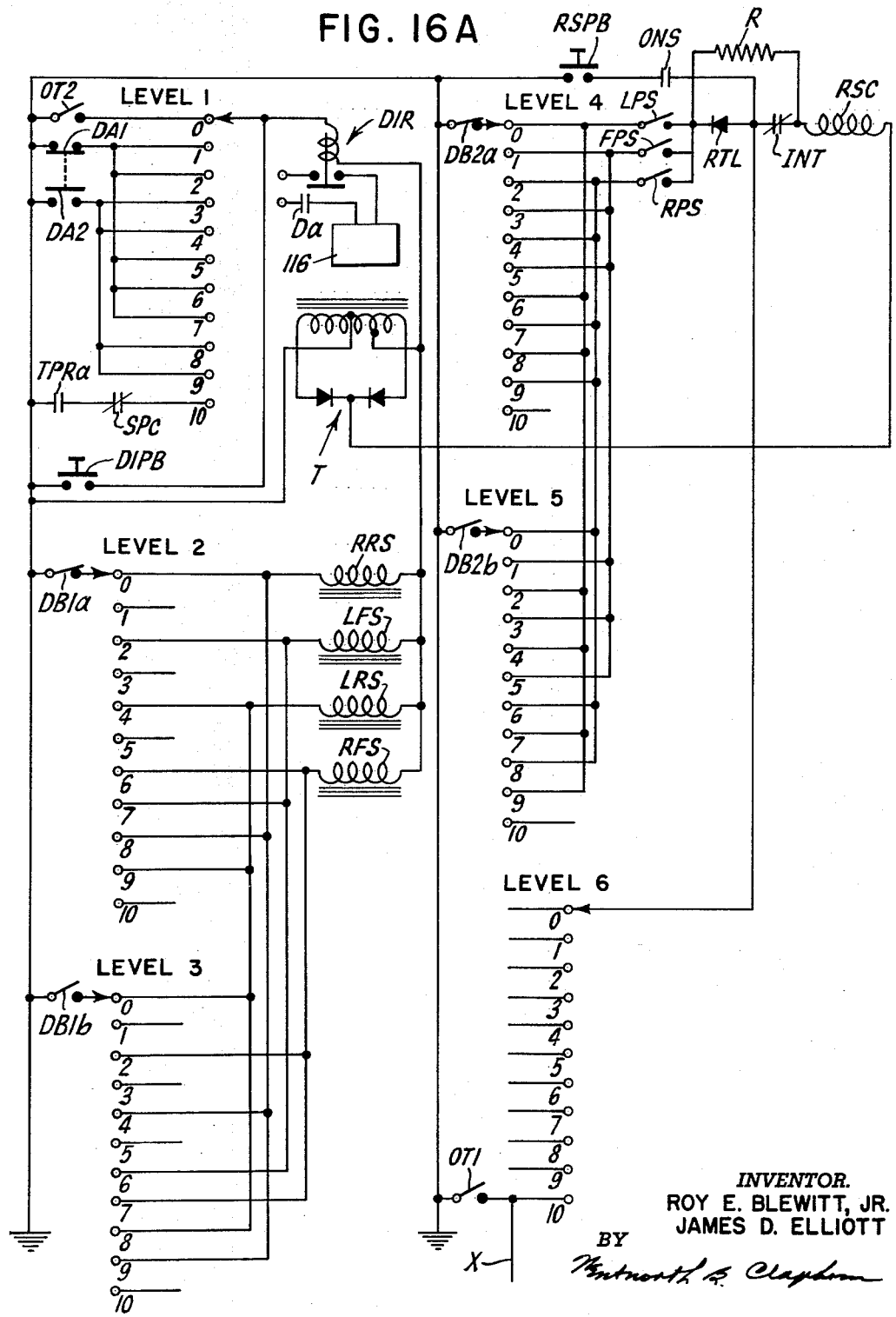

April 26, 1966 R. E. BLEWITT, JR., ET AL 3,248,109
INDEXING DISTRIBUTOR CONVEYOR WITH CONTROL
MEANS FOR PROGRAMMING SEQUENTIAL DELIVERY
OF PINS THEREFROM RELATIVE TO
CONVEYOR INDEXING
Filed May 18, 1962 11 Sheets-Sheet 10
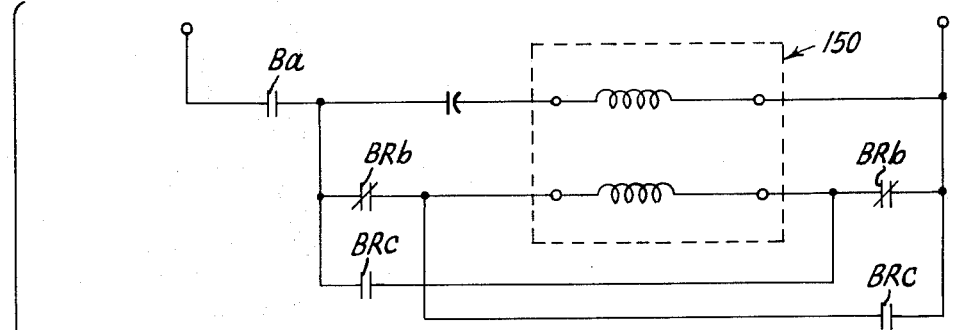
FIG.16B
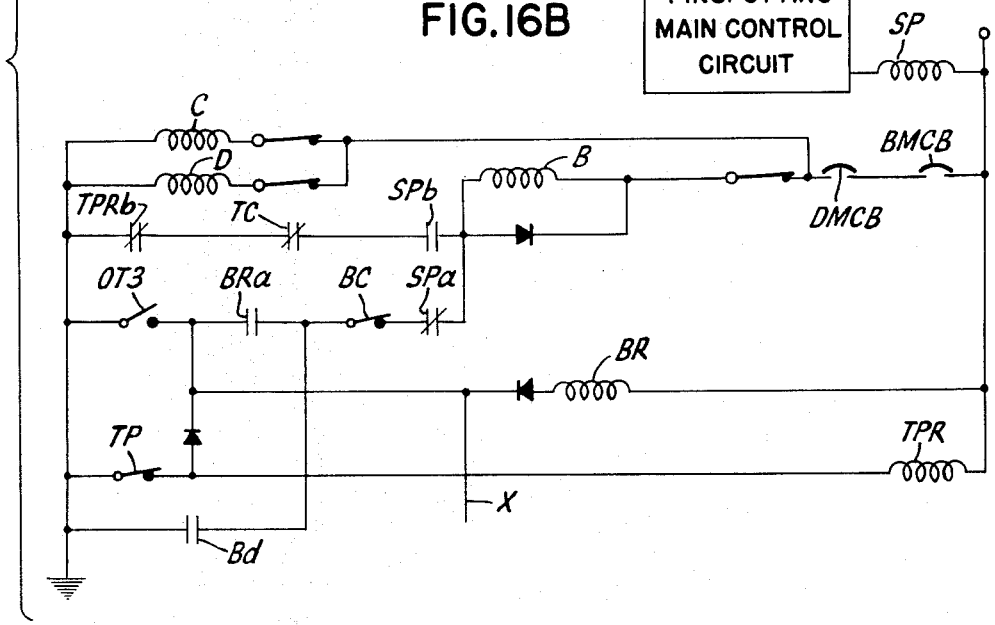
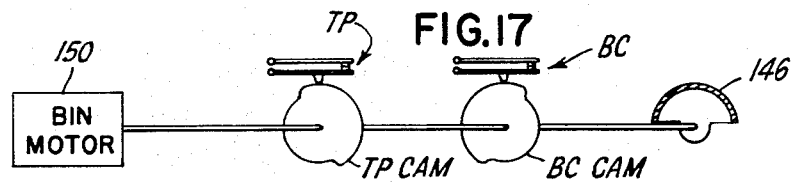
FIG.17
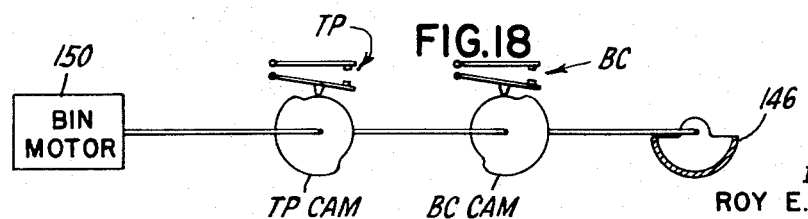
FIG.18
INVENTOR.
ROY E. BLEWITT, JR.
JAMES D. ELLIOTT
BY

FIG. 19

| DIRECTION OF TRAVEL (FIG.2A) | INDEXING POSITION (FIG.2A) | PIN No | OFF DISTRIBUTOR (FIG.3) | STEPPING LEVEL (FIG.16-A) | STEP OF LEVEL (FIG.16-A) |
|---|---|---|---|---|---|
| LEFT TO RIGHT | A | #10 | LEFT-REAR | 2 & 4 | 0 |
| | B | #3 | END | 3 & 5 | 1 |
| | | #6 | LEFT-FRONT | | 2 |
| | C | #1 | END | | 3 |
| | | #9 | LEFT-REAR | | 4 |
| | D | #2 | END | | 5 |
| | | #4 | RIGHT-FRONT | | 6 |
| | | #5 | LEFT-FRONT | | 7 |
| | E | #7 | RIGHT-REAR | | 8 |
| | | #8 | LEFT-REAR | | 9 |
| OVER TRAVEL | OTR | | | | 10 |
| RIGHT TO LEFT | E | #7 | RIGHT-REAR | | 0 |
| | D | #2 | END | 2 & 4 | 1 |
| | | #4 | RIGHT-FRONT | | 2 |
| | C | #1 | END | | 3 |
| | | #8 | RIGHT-REAR | | 4 |
| | B | #3 | END | | 5 |
| | | #6 | LEFT-FRONT | | 6 |
| | | #5 | RIGHT-FRONT | | 7 |
| | A | #10 | LEFT-REAR | | 8 |
| | | #9 | RIGHT-REAR | | 9 |
| OVER TRAVEL | OTL | | | | 10 |

INVENTORS
ROY E. BLEWITT, JR.
JAMES D. ELLIOTT
BY
ATTORNEY

United States Patent Office 3,248,109
Patented Apr. 26, 1966

3,248,109
INDEXING DISTRIBUTOR CONVEYOR WITH CONTROL MEANS FOR PROGRAMMING SEQUENTIAL DELIVERY OF PINS THEREFROM RELATIVE TO CONVEYOR INDEXING
Roy E. Blewitt, Jr., Southport, and James D. Elliott, Riverside, Conn., assignors to American Machine & Foundry Company, a corporation of New Jersey
Filed May 18, 1962, Ser. No. 195,928
14 Claims. (Cl. 273—43)

The invention relates to new and improved apparatus for receiving pins delivered from the pit of a bowling alley and redistributing them in a machine having devices for the spotting and respotting of pins on the alley.

In a bowling pinspotting machine, during successive bowling frames the pins which are knocked down and pins remaining standing after each frame generally are returned either directly to the spotting instrumentalities themselves or, as particularly taught in a copending application identified hereafter, to an intermediate storage section from which pins are supplied on demand. There is, naturally, a desire to provide pinspotting machines which operate very rapidly to the end that if desired a game can be played swiftly and without delay. It is essential, therefore, that the pin distributing apparatus keep pace with developments in this area by being capable of corresponding rapidity of operation in the return of pins to its receiver. As touched upon hereafter, other objects involve servicability, silence of operation, avoidance of mechanical complexity, dimensions affecting space consumption, positive and dependable pin control to avoid malfunction, and precautionary expedients for protection of the machine.

In a typical prior art arrangement, a distributor moves intermittently relative to a form of receiver adapted to accept a triangular array of individually delivered tenpins, but with only one pin being delivered at each of the indexing stops. In accomplishing proper registry of the receiver and distributor during this indexing, there may result a rather involved structural integration of these parts. In general, such a distributor is inherently limited to travel in a fixed endless path whereby the pattern of pin distribution is correspondingly limited.

A basically different concept and approach to pin distribution is involved in accordance with the disclosed invention, in which a greatly simplified but highly effective mechanical pin distribution structure is advantageously combined with an electrical operating system for programming the sequence of pin distribution. The distributor comprises merely a conveyor incorporated in a cantilevered boom or arm of fixed length which swings transversely above the receiver to which pins are delivered, and its operation and structure are not mechanically involved with that of the receiver. The principal mechanical parts, other than the swinging distributor structure itself, are simple elements which can be operated to cam or otherwise deflect pins to assigned locations. This distributor is progressively indexed, through a simple arc, to various positions in transverse relation to the receiver, and a prime mover for effecting this travel is controlled in conjunction with operation of the above mentioned elements by a common control system.

The invention outlined briefly above has several attributes, including particularly improved performance. In contrast to the delivery of only one pin at each stop, the present distributor is adapted to deliver one, two or three pins, or even more, per indexing stop. Also, a complete set of ten pins is delivered during its travel relative to the receiver in each direction of indexing travel. Because of this method of distribution, coupled with the nature of the simple overall mechanical arrangement, the mechanism is adapted to being operated at a high pin distribution rate if necessary.

In the operation of our present invention, the sequence in which a set of ten pins, intended for placement at the #1 through #10 spots, for example, is distributed is determined by the selective operation of the plural pin deflecting or camming elements in combination with intermittent operation of the means for transversely indexing the distributor. Although a preferred sequence having certain advantages is disclosed herein, flexibility is afforded in that many other possibilities exist. The aforementioned elements can be operated by simple solenoids and the distributor indexing can be similarly controlled electrically. Accordingly, this "programming" of a sequence is effected as desired through remote control by an electrical control system.

Though further objects and advantages will become obvious from the detailed disclosure, a few will be mentioned briefly. For example, because the distributing mechanism in the area above the receiver is confined to a cantilevered, self-contained arm or boom of small dimensions, this area is uncluttered for convenience in servicing and the possibility of interference with the distribution of pins is minimized. Further, from an architectural standpoint, the distributor does not impose an excessive vertical space requirement. Other features relate more directly to the control system in which, for example, certain precautionary measures are incorporated to insure against damage to the machine if for any unusual reason a malfunction occurs. Also, the control over pins being distributed is such that their behavior will be accurately sensed.

These and other objects and advantages will become apparent from the following description when read in conjunction with the accompanying drawings, in which:

FIGURE 2 is a partial plan view of the complete machine, illustrating the pin distributing apparatus in relation to the schematically shown pin storage section;

FIGURE 3 is a plan view of the swinging boom or arm portion of the distributing mechanism in accordance with the invention;

FIGURE 4 is a side elevation of the structure shown in FIGURE 3;

FIGURE 5 is a cross section through the distributor mechanism, taken as indicated by lines 5—5 in FIGURE 4;

FIGURE 6 is a vertical cross section taken as indicated by lines 6—6 in FIGURES 4 and 12;

FIGURE 7 is a vertical cross section taken as indicated by lines 7—7 in FIGURES 4 and 12;

FIGURE 11 is a detailed plan view of the forward end of the distributor mechanism;

FIGURE 12 is a side elevation of the mechanism shown in FIGURE 11, with the sides being partially broken away;

FIGURE 13 is a plan view of a unit for intermittently indexing the distributor mechanism transversely above the receiver to which pins are delivered;

FIGURE 14 is an elevation of the unit shown in FIGURE 13;

FIGURE 15 is an elevation illustrating particularly a braking device for the indexing unit;

FIGURES 16A and 16B together represent the electrical control circuit for the distributor mechanism;

FIGURES 17 and 18 schematically illustrate the operation of switch actuating cams associated with a particular pin storage section; and FIGURE 19 is a table representing the sequence of pin distribution by the disclosed pin distributing mechanism.

Figure 1:
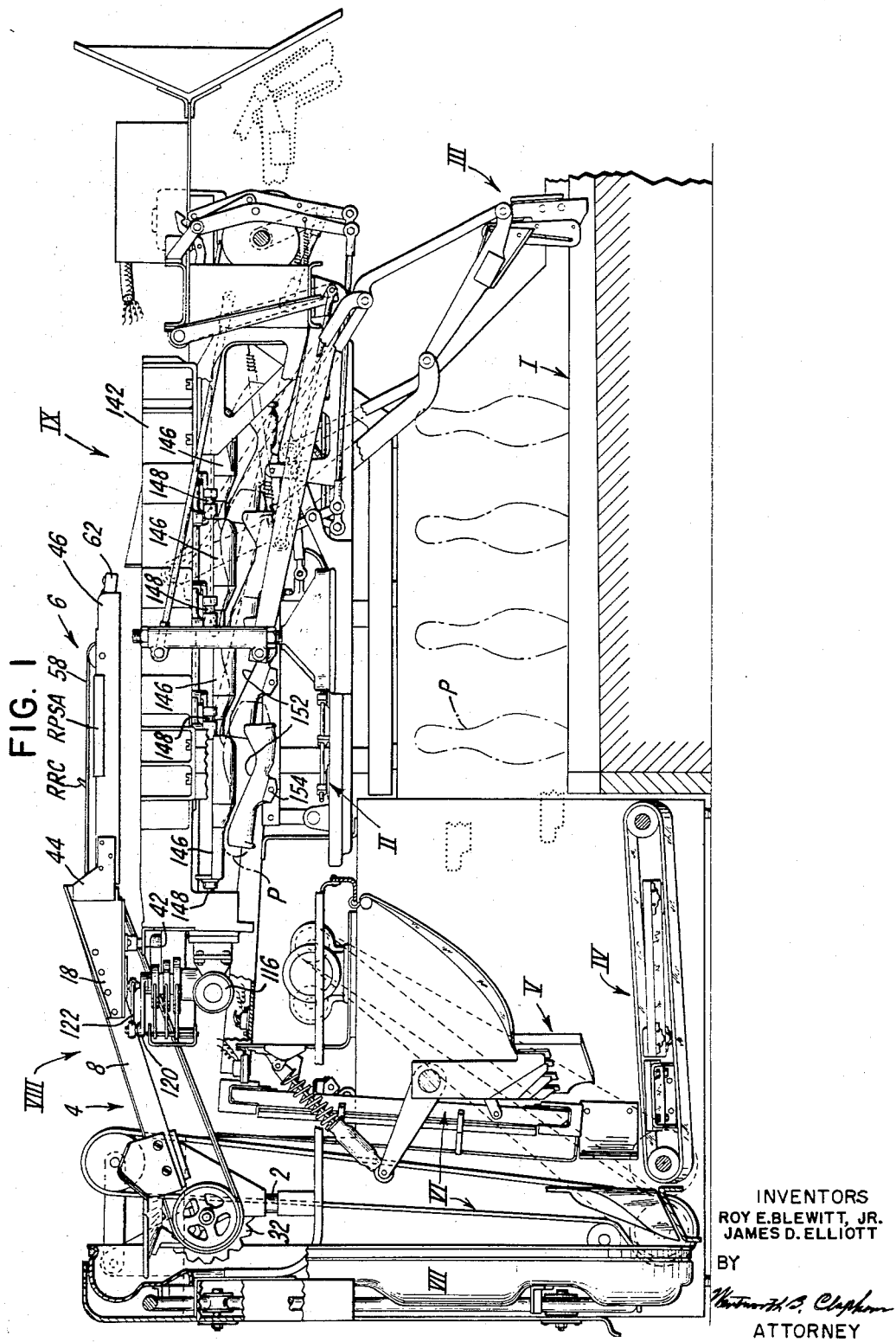
FIGURE 1 is a side elevation of a complete pinspotting machine embodying pin distributing mechanism in accordance with the invention.

A pin distributing mechanism in accordance with the invention will be described in its application to that particular pinspotting machine which is shown in FIGURE 1, although it will be understood that such mechanism is equally adaptable to other types. Referring to FIGURE 1, the pin deck I of the bowling alley has placed thereon a regulation array of tenpins P by spotting and respotting devices mounted on a table generally indicated at II. These devices form the subject matter of the copending application of Henry C. Congelli and Gordon W. Hays, Serial No. 195,926 entitled "Bowling Spotting and Respotting Mechanism" and filed May 18, 1962, to which reference can be made for a detailed description thereof. A sweep mechanism III is operative to remove to a pit conveyor IV the pins which are knocked down or which remain standing after each frame. A ball rolled down the alley strikes a backstop V, and is lifted to a ball return runway by a conveyor VI. Pins are delivered by the pit conveyor IV to a circular pin elevator VII which is the subject matter of the copending application of James D. Elliott, Serial No. 169,225, entitled "Bowling Pin Elevating Mechanism," filed January 29, 1962 and now Patent No. 3,179,410. The elevator VII delivers the pins to the pin distributing mechanism VIII which is the main subject matter of the present application, and which in turn distributes them in a predetermined sequence to compartments of a pin storage section IX. The pin storage section IX is the main subject matter of the copending application of Henry C. Congelli, Gordon W. Hays and Harold A. Jones, Serial No. 195,932, entitled "Bowling Pin Storage and Delivery Mechanism" and filed May 18, 1962.

The distributor VIII is embodied in a unitary structure in the form of a boom or arm which is mounted in the fashion of a cantilever above the storage section IX, and which swings about the vertical axis of a pivot pin 2 in movement transversely across the top of the storage section IX. The unitary structure making up this boom or arm comprises essentially the two principal distributor sections generally designated 4 and 6. The backbone of the distributor section 4 comprises a shallow U-shaped structural channel 8 which is rigidly connected to a rotary framework 10 having a depending pivot pin 2 (representing the swing axis of the distributor) which is rotatably received in a bushing 11 supported from a portion 13 of the machine frame. Journalled in the framework 10 is a shaft 12 to which pulleys 14 are keyed in axially spaced relation. At the opposite end of the distributor section 4, a shaft 16 is journalled in side plates 18 which are rigidly secured to the structural channel 8. Fixed on shaft 16 are pulleys 20, and about the respective pairs of pulleys 14 and 20 there are trained endless belts 22, each having a hexagonal cross-section (as shown in FIGURE 5) and good frictional pin-gripping surface qualities. Supporting track elements 24, mounted on the structural channel 8, are provided for the upper reach of each belt 22. The spacing between adjacent belts 22 (as evident in FIGURE 5) is less than the maximum diameter of a bowling pin P, and it will be evident that if the upper reaches of the respective belts 22 are driven in a direction toward the right in FIGURES 1 to 4, pins delivered onto the belts will be conveyed outwardly toward the distributor section 6. This driving of the belts 22 is effected by a motor 26, suitably mounted in the machine frame, and connected to the shaft 12 by means of drive shafting 28 and universal couplings 30.

Pins P are delivered from the pit of the alley by means of the pin elevator VII referred to previously. The operation of the pin elevator is described fully in said Patent No. 3,179,410, it being sufficient to note that as a pin is carried to the uppermost portion (shown partially broken away in FIGURE 1) of the pin elevator VII it is dropped therefrom into a funnel-like hopper 34 with its upper end directed toward the rear of the machine. Hopper 34 is flanked by front guide plates 36 which are affixed to the side of structural channel 8. A wheel 32 having an undulated peripheral configuration is driven in clockwise direction (FIGURE 4) by shaft 12 and extends upwardly through an opening 38 in the bottom of hopper 34, whereby the wheel 32 engages pins received from the pin elevator VII and assists in their delivery onto the belts 22. Operation of the distributor VIII involves a swinging movement thereof about the axis defined by pivot pin 2, and for the purpose of supporting the distributor during such transverse movement across the storage section IX there is provided a pair of shoes 38 affixed to a bracket 40 beneath the distributor section 4. During such swinging movement the shoes 38 slide upon a shelf provided by a frame bracket 42.

The backbone of the distributor section 6 is rectangular in cross section and comprises a first sheet metal portion having an inverted U-shaped cross-section forming side panels 46 and a table surface 50, and by a bottom plate 48 secured to the U-shaped section. The distributor section 6 is integrated with the distributor section 4 by means of side plates 44 rigidly connecting the side panels 46 and side plates 18. On the shaft 16 which is journalled in the plates 18 there is provided, in addition to pulleys 20, a second pair of pulleys 52. At the other extremity of the side panels 46 there is journalled therein a shaft 54 rotatably mounting a third pair of pulleys 56 having the same mutual spacing as that of pulleys 52. About the respective pairs of pulleys 52 and 56 there are trained endless pin-gripping belts 58 which, when driven from shaft 16 through the previously mentioned belts 22 and pulleys 20, provide a pin conveyor in extension of the conveyor provided by belts 22. As evident in FIGURES 6 and 7, the belts 58 are supported vertically, and guided and constrained against outward lateral movement, by means of elongate track elements 60. In operation, under certain conditions which will be described hereafter a pin P is conveyed the full length of the distributor section 6 and is dropped from the end thereof, and for the purpose of guiding a pin during this travel there are provided spaced arms 62 which project from distributor section 6 in extension thereof. The arms 62 slope downwardly slightly and carry a plurality of rollers 64, each roller 64 being mounted for free turning movement by a stud 66. Thus a pin which runs off the end of belts 58 will be deposited on rollers 64 and thence will drop from the end of the distributor.

Figure 8:
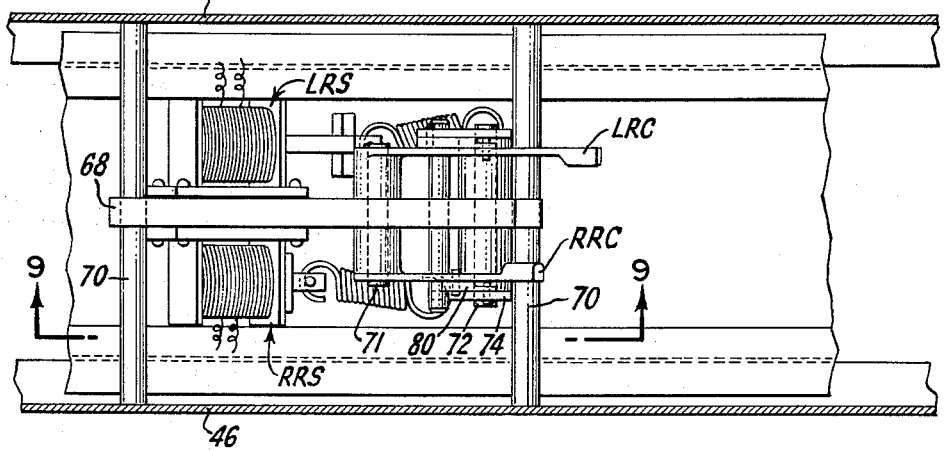
FIGURE 8 is a plan view of the assembly of cams provided to deflect pins off the rearward sides of the distributor, with the obscuring parts being broken away.
Figure 10:
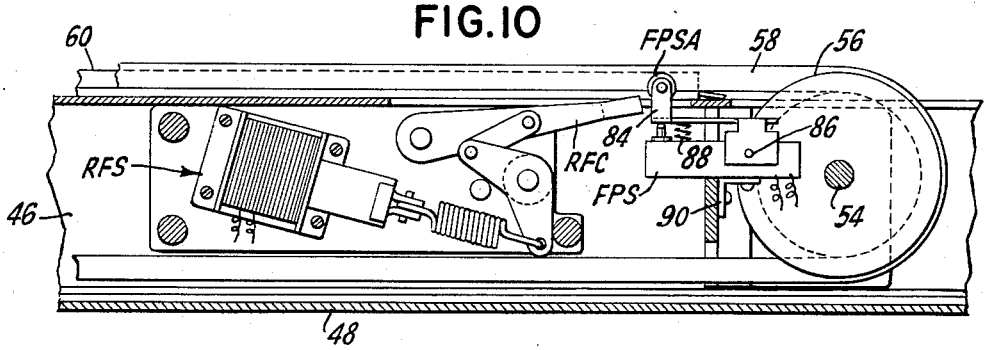
FIGURE 10 is a view, similar to FIGURE 9, showing the cams provided to deflect pins off the forward sides of the distributor.
Figure 9:
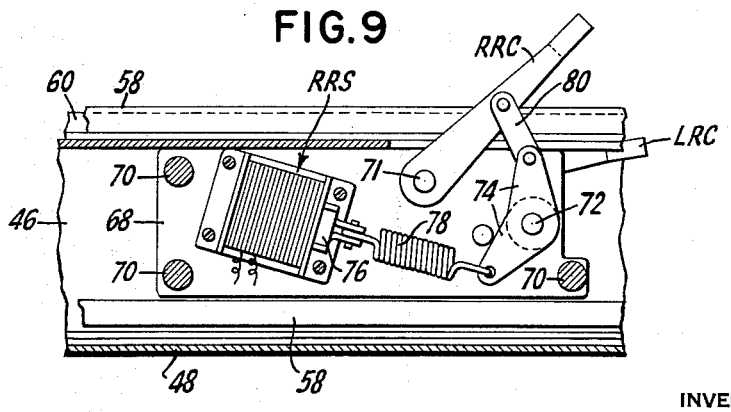
FIGURE 9 is a lengthwise section taken as indicated by lines 9—9 in FIGURE 8.

Toward the rear of the distributor section 6 and centrally between the side panels 46 there is provided a vertical plate 68 which is supported by cross rods 70. At this rearward location along the length of the distributor there is mounted a pair of gates or cams, either of which can be projected upwardly through an opening 67 to act upon a pin P in such a manner that it is cammed off one side of the distributor. By way of introduction to this aspect of the invention, and as a preliminary to the aspects of control described in detail hereafter, it should be noted that the terms "left" and "right" will be used herein as the distributor would appear when looking downwardly in a direction from the pin elevator VII toward the far end of the distributor represented by the arms 62. In other words, the terms "left" and "right" will be used in the frame of reference of one looking at the distributor from the left in FIGURES 2, 3 and 11. Returning then to the matter of the gates or cams, and referring to FIGURES 8 and 9 in particular, a left rear cam will be identified and abbreviated herein as LRC, and a right rear cam will be identified and abbreviated herein as RRC. The cam RRC is freely pivotal about a pin 71 extending from plate 68. On a similar pin 72 there is mounted a bell crank lever 74 having its one arm connected to the armature 76 of a solenoid by means of a tension spring 78, and its other arm connected intermediately to the cam RRC by a link 80. This solenoid for driving the right rear cam RRC is identified and abbreviated in FIGURES 8 and 9 as as well as in the hereafter described electrical circuit as RRS. RRS is shown in FIGURE 9 in its energized condition, wherefrom it will be evident that energization of this solenoid will effect, through spring 78, lever 74 and link 80, the abrupt raising of cam RRC directly into the path of a pin conveyed along belts 58. The rearward left cam LRC is mounted for actuation in an arrangement identical to that provided for the rearward right cam RRC, and through such means is driven in similar manner by a solenoid LRS. The energization of solenoid LRS will effect the abrupt raising of cam LRC through one of the openings 67.

Forward of the location of cams LRC and RRC, i.e. away from these cams in the direction of the free end the distributor, there is provided a second pair of cams. The first of this second pair of cams is at the left front of the distributor and therefore is identified LFC, and the second of these cams being at the right front of the distributor is identified herein as RFC. The LFC and RFC cams are driven, respectively, by solenoids identified and abbreviated LFS and RFS. The mountings and linkages for cams LFC and RFC also are identical with those of the cam RRC previously described.

Reviewing briefly the operation of the left rear cam LRC, the right rear cam RRC, the left front cam LFC and the right front cam RFC, if any one of these cams is raised a pin will be cammed thereby off the opposite side of the distributor and at a location along its length depending upon whether the actuated cam is toward the front or the rear. For example, if the LRC cam is raised it will cam a pin toward and off the right side of the distributor. (As will become evident from the description hereafter, this will result in the dropping of a pin into a position in the storage section IX corresponding to the position of either the #7, #8 or #9 bowling pin). It is desired, in other instances, not to raise any of the Cams LRC, RRC, LFC and RFC, but rather to permit a pin to proceed toward and off the extremity of the distributor.

Now, in accordance with the invention means are provided to signal the completed movement of a pin off either a side or the end of the distributor. Referring to FIGURES 7, 11 and 12 particularly, the movement of a pin off the end of a distributor is signalled by means of a front pin switch which is identified and abbreviated herein as FPS. The actuation of the switch FPS is effected by means of a front pin switch actuator, designated FPSA (FIGURES 7, 11 and 12). The actuator FPSA generally comprises a roller which normally is held in position above the table surface 50 by means of an arm 84, pivotally mounted at 86. Arm 84 is adapted to be depressed by a conveyed pin and to depress thereby an element 89 effecting closure of switch FPS. The actuator FPSA is normally urged toward its upper position by a spring 88. The operation, therefore, is that a bowling pin travelling off the end of the distributor will momentarily depress the actuator FPSA to close momentarily the front pin switch FPS, the function of which will be more fully elaborated in the description hereafter.

If any one of the cams LRC, RRC, LFC and RFC is actuated and raised, a pin will be cammed off the side of the distributor and it is desired to provide a signal indicative of the movement of the pin off either side of the distributor. To this end, referring particularly to FIGURES 6, 7, 11 and 12, there is provided a left pin switch designated LPS and a right pin switch designated RPS. Both these switches, LPS and RPS, are supported by a mounting plate 104 extending transversely between the distributor side panels 46. The left pin switch LPS is actuated by a member designated generally LPSA and which in form is L-shaped, extending from adjacent its associated belt 58 toward the upper corner of side panel 46 and thence downwardly. The right pin switch RPS is actuated by a similar member designated RPSA. The actuators LPSA and RPSA have identical mountings including for each a forward arm 96 pivotally mounted on a pin 98 extending from the cross-plate 94, and a rearward arm 100 pivotally mounted on a pin 102 extending from the cross-plate 104. Through its associated arm 100 the actuator LPSA is adapted to depress the operating element 106 of switch LPS, a compression spring 108 being provided to urge the actuator upwardly to a normal position. Similarly, through its associated arm 100 the actuator RPSA is adapted to depress the operating element 110 of switch RPS, with a similar compression spring 112 urging the actuator upwardly to its normal position. The operation of the elements just described is that as a pin is cammed off the right side of the distributor by either of the left cams LRC and LFC the pin will depress the actuator RPSA to operate switch RPS (to a closed condition as will become more significant hereafter), or as a pin is cammed off the left side of the distributor by operation of either of the right cams RRC and RFC the pin will depress actuator LPSA to operate switch LPS (also to a closed condition).

As previously mentioned, the distributor VIII is moved bodily in a swinging motion about the pin 2, and the means for effecting such motion will be described with reference particularly to FIGURES 13 and 14. Such means include a distributor indexing unit which will be generally identified as DI in abbreviation. The prime mover of the distributor indexing unit DI is an electric motor 116, suitably supported from the frame structure, and having a right angular output drive shaft 118. Keyed to shaft 118 is a crank arm 120 which in turn is connected to the distributor section 4 by a connecting rod 122, whereby the continuous rotation of shaft 118 in a clockwise direction (as viewed in FIGURE 13) would effect harmonic oscillation of the distributor VIII. Also keyed to the shaft 118 are three cams which have an important function in the programming of the distributor indexing movements. These cams will be referred to herein and identified as the DB Cam, the OT Cam (for "overtravel"), and the DA Cam. The configurations of these cams and their respective functions will be described hereafter in connection with the overall distributor control circuit. However, for the present it is sufficient to note that three switch-actuating cam followers numbered 128, 130 and 132 are provided for DB Cam, OT Cam, and DA Cam, respectively. For the purpose of providing a braking action to prevent overrun, a brake is provided in the form of elements 134 pivotally mounted at 136 and having shoes 138 which are pressed against opposite sides of the DA Cam by means of a simple spring arrangement generally indicated at 135. Each of the switch-actuating cam followers 128, 130 and 132 is biased into cam engagement by a tension spring, one of which is indicated at 133.

The pin storage section IX comprises a structure defining a plurality of pin receiving pockets, compartments or bins arranged in conformity to the regulation array of pins spotted on the alley, and accordingly these "bin pockets" are designated in FIGURE 2 by the references #1 through #10. The respective bin pockets #1 through #10 are essentially identical in structure. The #1 pocket is exceptional, however, in that guide rollers 144 are provided at the upper edge of the narrower rearward portion of the pocket. It will be noted that the spacing between the opposite rows of guide rollers 144 is less than the maximum diameter of a bowling pin P, and therefore a pin delivered from the end of the distributor will proceed forward on the rollers 144 before dropping fully into the #1 bin pocket. The storage section IX having the pockets #1 through #10 is stationarily supported from the machine framework 140 at a level beneath the outer distributor section 6 and above the spotting table II. Each of the pockets #1 through #10 is bottomless, and the opening at the bottom of the pocket is obstructed by one of a plurality of bin cups 146. Each of the cups 146 has an internal shape compatible with that of a bowling pin P, and is adapted to cradle a pin when all of the cups 146 are in a position as indicated in FIGURE 1. Each of the cups 146, however, is rotatable about its lengthwise axis by virtue of a trunnion mounting comprising a pair of spindles 148, whereby the cup may be turned from the upright position shown in FIGURE 1 to an inverted position wherein a pin will be dropped from the cup. The spindles 148 of the ten bin cups 146 are ganged through suitable drive means (not shown) for identical simultaneous movements. This driving of the cups between upright and inverted positions is effected by a motor 150 which is controlled by an electrical circuit described hereafter. It is again noted that the storage section IX is described in greater detail in the copending application of Congelli, Hays and Jones, Serial No. 195,923.

Also, the structure associated with the spotting table II is described in detail in said copending application of Congelli and Hays, Serial No. 195,926.

On the spotting table II there is provided directly beneath each of the bin cups 146 a pin spotting cup 152, which in operation is rotated about a pivot 154. The rotation of a cup 146 from an upright to an inverted or upside-down position, therefore, effects the dropping of a pin into the associated spotting cup 152. Subsequently, the placement of the pin on the alley I is effected by downward movement of the table II and conjoint movement of the cups 152 to an upright position followed by release of the pins and upward withdrawal of the table II.

The control circuits for the distributor will now be described with reference mainly to FIGURES 16–A and 16–B. Preliminary to such description, however, the system adopted in illustration of various relays will be explained. In the interest of presenting a more easily readable circuit diagram, the contacts of certain relays are shown disassociated from their operating coils. For example, in FIGURE 16–B the coil of a spotting relay is indicated by the letters SP, while the contacts which are operated by the energization thereof are identified as SPa, SPb, and SPc. In accordance with this nomenclature, energization of SP will effect opening of contacts SPa and SPc and closing of contacts SPb.

The programming of the distributor operation, involving control of the distributor pin cams LRC, RRC, LFC and RFC in coordination with control of distributor indexing, is effected by a memory device in the form of a stepping relay shown in FIGURE 16–A. This stepping relay has six levels as indicated, each level having eleven steps running from 0 through 10. The levels are non-bridging, and the movable brush contacts (shown as arrows) for all of the levels simultaneously are on the same step. The stepping relay shown in FIGURE 16–A is conventional and commercially available as shown with exception of the external connections involved for purposes of adaptation to the present distributor programming, and therefore need not be described in great detail. The stepping of this relay is effected by the relay stepping coil designated RSC. The electrical power supply for driving the distributor portion of the control circuit is provided by a transformer generally indicated T, which incorporates rectifiers for the supply of direct current to the stepping coil RSC. The energization of coil RSC may be effected by closure of either of the switches LPS, FPS and RPS (through reasons of circuitry which will be traced hereafter). It will be recalled that the last-mentioned switches are the pin switches which are associated with the distributor and which are closed in response to the movements of pins off the sides and end of the distributor. Upon closing of one of the switches LPS, FPS, and RPS the coil RSC will be energized through a rectifier RTL and interrupter contacts INT, but upon energization of coil RSC the contacts INT will be opened and the circuit through RSC will be held in at a lower voltage through a resistor R. The actual stepping of the relay will not actually occur until the switch LPS, FPS or RPS initiating this action has been restored to an open condition, signifying that a pin has completely cleared the distributor boom. Alternatvely, the coil RSC may be energized through a relay stepping pushbutton designated RSPB, in connection with which it should be noted that an off-normal switch ONS is opened when the six levels of the stepping relay are at step 0. Also, immediate stepping of the relay may be effected through the closing of a switch OT1 (operated by the OT Cam) when Level 6 is on step 10. The solenoids RRS, LFS, LRS & RFS that were mentioned previously in connection with the pin cams RRC, LFC, LRC and RFC respectively, also are shown in FIGURE 16–A.

The solenoid RRS can be energized to operate pin cam RRC (at the right rear of the distributor) through Level 2 when the relay is on step O or step 8, or through Level 3 when the stepping relay is on either step 4 or step 9.

The solenoid LFS can be energized to operate the pin cam LFC (at the left front of the distributor) through Level 2 when the relay is on either step 2 or step 7 or through Level 3 when the relay is on step 6.

The solenoid LRS can be energized to operate the pin cam LRC (at the left rear of the distributor) through Level 2 when the relay is on either step 4 or 9, or through Level 3 when the stepping relay is on either step 0 or step 8.

The solenoid RFS can be energized to operate the pin cam RFC (at the right front of the distributor) through Level 2 when the relay is on step 6, or through Level 3 when the relay is on either step 2 or step 7.

It should be noted that Level 2 and Level 3 are not operative concurrently because of the arrangement of siwtches DB1a and DB1b. These switches alternate in their operation in that when one is open the other is closed, and vice versa. Switches DB1a and DB1b are operated by the DB cam previously mentioned (FIGURE 13), in such manner that as the distributor moves from right to left (in FIGURE 2, or from the #7 pin side to the #10 pin side) switch DB1a is closed and switch DB1b is open, and when the distributor moves from left to right (or from the #10 pin side to the #7 pin side) switch DB1a is open and switch DB1b is closed. It will be understood that switches DB1a and DB1b are operated by the switch-actuating cam follower 132 (FIGURE 14). Specific timing in the operation of the DB Cam will be deferred until the more detailed description of operation given hereafter. Levels 4 and 5 alternate in their operation in accordance with operation of Levels 2 and 3 respectively due to the provision of switches DB2a and DBbb, which also are operated by the DB Cam. Thus, in other words, switches DB1a and DB2a are simultaneously closed while switches DB1b and DB2b are simultaneously open, and vice versa.

The connection of the distributor indexing motor 116 to an independent power supply is controlled by a distributor indexing relay DIR, the contacts of which are closed to effect running of the motor 116 during energization of the relay coil. (Although the relay DIR effects intermittent operation of a motor, it optionally can operate a clutch mechanism between a constantly running motor and the intermittently driven distributor.) The contacts Da of a relay are normally held closed by energization of the relay coil D, shown in FIGURE 16B. Relay DIR can be energized either through Level 1 of the stepping relay or through a distributor indexing pushbutton identified DIPB. If DIPB is depressed the motor 116 will run continuously until the pushbutton is released. The purpose of the DA Cam, previously mentioned (FIGURE 13), is to operate through its switch-actuating cam follower 128 a pair of switches DA1 and DA2. These switches are operated alternately by the DA Cam, in that when one switch is open the other is closed, and vice versa. Referring to FIGURE 13, switch DA1 is closed and switch DA2 is opened when the switch-actuating cam follower 128 is lifted by one of the lobes w, x, y and z on the DA Cam. When the switch-actuating cam follower 128 is riding on a portion of the DA Cam between one of these lobes w, x, y and z the DA1 switch is closed and the DA2 switch is opened.

Switch DA1 is connected in series with steps 1, 2, 5, 6 and 7 of Level 1 and, therefore, if the stepping relay is at one of these steps at a time when switch DA1 is closed by the action of a cam lobe w, x, y or z the relay DIR will be energized, which will effect running of the motor 116 until the cam follower 128 rides off the end of a lobe and switch DA1 opens.

Switch DA2 is connected in series with steps 3, 4, 8 and 9 of relay Level 1. Therefore, if the relay is on one of these steps at a time when switch DA2 is closed by the DA Cam (under the conditions described above), the relay DIR will be energized to effect running of the motor 116 until switch DA2 is closed through engagement of one of the lobes w, x, y and z by the cam follower 128.

Two relays, TPR and SP (FIGURE 16-B), have their normally open and normally closed contacts TPRa and SPc, respectively, connected in series with step 10 of relay Level 1 for purposes mentioned hereafter.

In Level 6 of the stepping relay, steps 0 through 9 are "dead," in that they have no controlled external circuit connection. Step 10 is connected in series with a switch OT1 which is operated by the OT Cam (FIGURE 13), the operation of which will be explained hereafter. Switch OT1 is connected in series with a bin reverse relay BR, shown in FIGURE 16-B. For the present it is sufficient to note that relay BR can be energized through the closure of switch OT1.

The circuitry shown in FIGURE 16-B represents mainly the controls involving operation of the bin cups 146. Arrangement of the storage section IX, involving these bin cups, is the subject matter of said copending application of Congelli, Hays & Jones, Serial No. 195,923.

The distributor circuit shown in FIGURE 16-A has a certain controlling effect on the circuitry shown in FIGURE 16-B through operation of switch OT1, and the distributor circuit shown in 16-A has been engineered so that to some extent it is affected by factors of bin cup operation through means of the contacts TPRa and SPc. However, the distributor which is the subject matter of the invention is adapted to operate in complete independence of any factors involving the nature of the receiver being fed by the distributor. In other words, the distributor VIII is not limited in its use to the feeding of the type of receiver represented by storage section IX, which has bin cups 146 and is limited in capacity to the reception of only two levels of pins. (This is the capacity when the bin cups 146 are upright, but when the bin cups 146 are inverted only an upper storage level is provided.) The sole functions of the contacts TPRa and SPc are, respectively, to shut off the distributor when the storage section IX is filled with twenty pins and to delay momentarily the operation of the distributor and the bin cups during operation of the spotting table II.

Accordingly, the operation of the distributor will now be described independently of any aspects involving operation of the bin cups, and solely for purposes of this isolated description let it be assumed that the contacts TPRa and SPc are not present in the line, or that such contacts are fixed in closed condition. Then, hereafter, the bin control circuit FIGURE 16-B) and aspects of the distributor affecting its operation will be described.

Figure 2A:
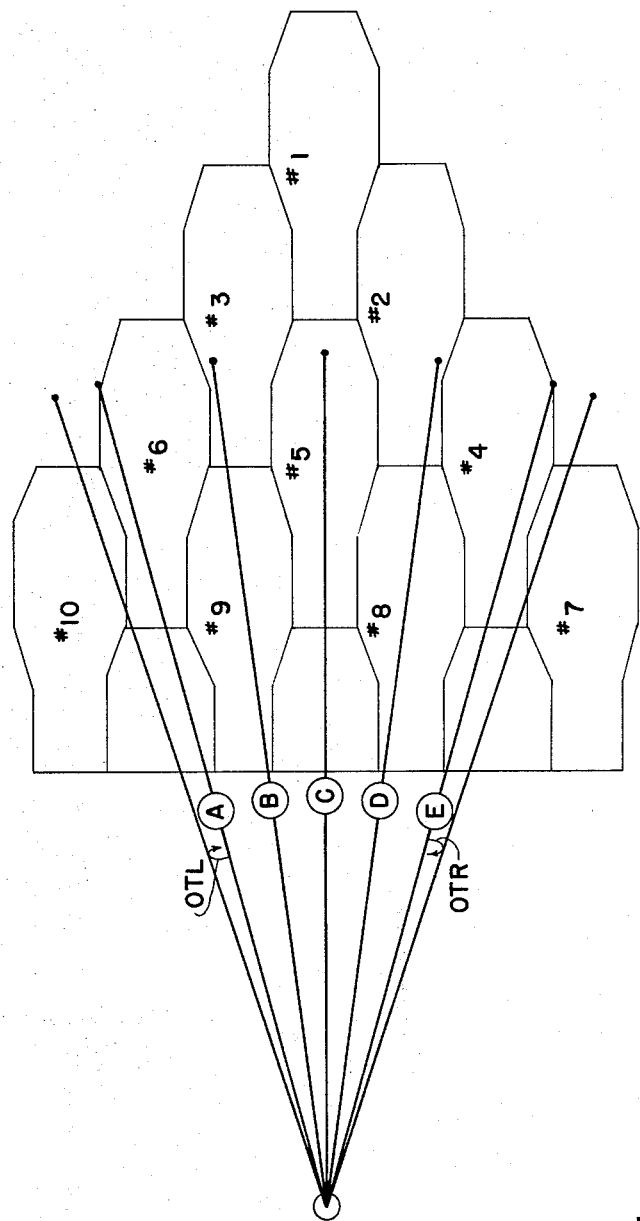
FIGURE 2A is a schematic illustration in which the indexing positions of the distributor in relation to the various pin compartments or pockets are represented by the center line of the distributor.

In FIGURE 16-A all of the six stepping relay levels are shown on step 0. In FIGURE 2A there are schematically illustrated five indexing positions of the distributor relative to the bin pockets #1 through #10. The distributor has just moved from the left toward the right and is now in the Position A, and is about to move toward the left and back to position A in what will be referred to herein as "overtravel" OTL. Although in FIGURE 16-A the stepping relay is shown on step 0, as a starting point assume that the relay is still on step 10. The DB Cam, OT Cam and DA Cam will then be in the positions shown in FIGURE 13. On step 10 the relay DIR will be energized through Level 1 to effect running of motor 116 (the relay contacts Da now being closed), thereby beginning to drive the distributor from Position A (FIGURE 20) toward the left. Immediately thereupon, at point s on OT Cam, the follower 130 will drop to effect closing of switches OT1 and OT2. The closing of switch OT1 will effect immediate energization of relay stepping coil RSC, whereby the six levels of the stepping relay will shift to step 0. Because of the closure of switch OT2, relay DIR will remain energized and motor 116 will continue to run despite stepping of the relay. As the distributor is driven by motor 116 through the left overtravel motion OTL and back to Position A (FIGURE 2A), however, point t on OT Cam will be brought into engagement with switch-actuating cam follower 130 and thereby switch OT2 will be opened to interrupt operation of the motor 116. It is to be noted that at this stage of the operation the DA Cam is holding switch DA1 open and switch DA2 closed. The DB Cam is holding switches DB1a and DB2a closed and holding switches DB1b and DB2b open.

Under the above conditions pins are being delivered by the pin elevator VII to the hopper 34 and are being carried toward the front of the distributor by belts 22 and 58. Recalling that the stepping relay is on step 0, and that the solenoid RRS for the right rear pin cam is in series with the step 0 of Level 2, the cam RRC will be raised. As evident from FIGURE 2A, when the distributor is in Position A it is disposed to the right of the #10 bin pocket. Therefore, the raising of pin cam RRC effects the camming of a pin off the left side of the distributor and into this #10 pocket. The left pin switch LPS also is in series with step 0, Level 4, and therefore is active. In consequence, as the pin drops off the left side of the distributor and depresses the left pin switch actuator LPSA the stepping coil RSC will be energized and all six levels of the relay will move to step 1. Such stepping of the relay effects de-energization of solenoid RRS and cam RRC therefore is withdrawn immediately from its active raised position.

With the distributor now in Position A (FIGURE 2A), and switch DA1 being closed by the DA Cam (FIGURE 13), on step 2 relay DIR will be energized to effect driving of the distributor to Position B. As Position B is reached, the lobe y of the DA Cam and point q on the DB Cam will act on switch-actuating cam followers 128 and 132. This will effect, first, the opening of switch DA1 and the closing of switch DA2. Secondly, it will effect the opening of switches DB1a and DB2a and closing of switches DB1b and DB2b. Due to this latter condition, Levels 2 and 4 of the stepping relay are cut out of operation and levels 3 and 5 are put into operation. The distributor is now in Position B. Step 1 of Level 3 is "dead," in that it is not connected to operate any of the solenoids LRS, RRS, LFS and RFS. Therefore, a pin which in the meanwhile has been conveyed toward the end of the distributor will not be cammed off a side of the distributor by operation of one of these pin cams, but instead will proceed directly off the end of the distributor and into the #3 bin pocket. Step 1 of Level 5 is in series with the front pin switch FPS, which therefore is now active, and in clearing of the pin from the end of the distributor the depression of the switch actuator FPSA will effect energization of the stepping coil RSC. The relay now shifts to step 2. In the meantime, the distributor has been in Position B and no rotation of the DA Cam has taken place to change the prior state of switches DA1 and DA2. Therefore, referring to Level 1, upon shifting to step 2 the switch DA1 in series therewith still remains open and consequently the distributor is not indexed following dropping of the #3 pin.

On step 2, then, the distributor remains in Position B and the next pin proceeds toward the end of the distributor. Step 2 of Level 3 is in series with the solenoid RFS for the right front pin cam, and therefore on this step solenoid RFS will be energized to effect camming of a pin off the left front side of the distributor and into the #6 bin pocket. Step 2 of Level 5 is in series with the left pin switch LPS, and as the #6 pin leaves the left front side of the distributor, therefore, the stepping coil RSC is energized to shift the six levels of the relay to step 3.

With the distributor in Position B the switch DA2 is now closed, and therefore on step 3 a circuit is completed through distributor indexing relay DIR and motor 116 operates to drive the distributor to Position C (FIGURE 20). As the distributor approaches Position C the switch-actuating cam follower 128 rides off the lobe y of the DA Cam and thereby effects the opening of switch DA2 and closing of switch DA1, thus interrupting running of motor 116. Step 3 of Level 3 is dead and therefore none of the distributor pin cams LRC, RRC, LFC and RFC is raised. The next pin on the distributor is then permitted to proceed off the end of the distributor and into the #1 bin pocket. This #1 pin closes the front pin switch FPS which is in series with step 3 of Level 5 and thereby the stepping coil RSC is energized to shift the relay to step 4.

On step 4, with the distributor still in Position C, the switch DA2 which is in series with step 4 of Level 1 is still open. Therefore, upon shifting to step 4 the relay Level 1 does not effect energization of relay DIR and indexing of the distributor does not occur. Step 4 of Level 3 is in series with solenoid RRS for raising the right rear pin cam, and upon the resulting energization thereof the next pin proceeding along the distributor is cammed off the left rear side of the distributor and into the #9 bin pocket. This #9 pin, in leaving the distributor, closes the left pin switch LPS to effect energization of stepping coil RSC and shifting of the relay to step 5.

On step 5, with the distributor in Position C, switch DA1 is held closed by the DA Cam. Therefore, energization of relay DIR and indexing of the distributor in the director of Position D (FIGURE 2A) occurs. As the distributor reaches Position D the switch-actuating cam follower 128 is lifted by the lobe z of the DA Cam, resulting in opening of switch DA1 and interruption in the running of motor 116. With the distributor now in Position D, because step 5 of Level 3 is dead none of the distributor pin cams is raised and the next pin proceeding along the distributor is permitted to drop from the end of the distributor and into the #2 bin pocket. This #2 pin, in leaving the distributor, closes the front pin switch FPS which is in series with step 5 of Level 5 and through resultant energization of coil RSC the relay is shifted to step 6.

Step 6 also is in series with the now open switch DA1 and therefore distributor indexing does not occur. Step 6 of Level 3 is in series with solenoid LFS and therefore the left front pin cam is raised to cam the next pin off the right front side of the distributor and into the #4 pin pocket. This #4 pin closes the right pin switch RPS upon leaving the distributor and thereby effects shifting of the relay to step 7.

Step 7 of Level 1 also is in series with the now open switch DA1 and therefore the distributor again does not index but remains in Position D. Step 7 of Level 3 is in series with solenoid RFS, which raises the right front pin cam RFC to cam the next pin off the left front of the distributor and into the #5 pin pocket. This #5 pin closes the left pin switch LPS and effects shifting of the relay to step 8.

On step 8, with the distributor still in Position D, the switch DA2 is closed and therefore relay DIR is energized through step 8 of Level 1 to effect driving of the distributor by motor 116 toward Position E (FIGURE 2A). As the distributor approaches Position E the switch-actuating cam follower 128 rides off the lobe z of the DA Cam and opens switch DA2 to interrupt operation of motor 116. With the distributor now in Position E the next pin proceeding along the distributor is cammed off the right rear of the distributor into the #7 bin pocket due to energization of solenoid LRS which is in series with step 8 of Level 3. This #7 pin closes the right pin switch RPS to effect shifting of the relay to step 9.

Step 9 also is in series with the now open switch DA2 and indexing will not occur. Step 9 of Level 3 is connected to solenoid RRS and therefore the next pin will be cammed off the left rear side of the distributor into the #8 bin pocket. This #8 pin will close the left pin switch LPS and effect shifting of the relay to step 10.

The distributor is now ready for the overtravel movement designated OTR at the right in FIGURE 2A, and with the previously made assumption that contacts TPRa and SPc are closed, on step 10 the relay DIR will be energized and motor 116 will operate. Immediately following the beginning of this movement toward the right and away from Position E, the switch-actuating cam follower 130 will drop at point u on the OT Cam to close switches OT1 and OT2. The closing of switch OT1 effects immediate energization of relay stepping coil RSC and consequent return of the relay back to step 0. Due to the now closed condition of switch OT2 the distributor motor 116 will continue to run until the cam follower 130 is raised at point v on the OT Cam to open switch OT2 and thereby open the circuit through motor 116. This point v is brought into action as the distributor returns to the Position E, the "overtravel" then being completed.

What has been described above is graphically outlined in the upper half of FIGURE 19. The distributor is now ready to begin movement from right to left, or from Position E back to Position A in FIGURE 2A. Though the sequence in the dropping of pins is somewhat different, the principles of circuit operation involved in such movement are essentially the same as involved in the left to right indexing above described. Therefore, the remaining steps in a complete cycle of operation will be described only generally.

With the distributor now in Position E, and the relay on step 0, the next pin proceeding along the distributor is cammed into the #7 bin pocket by operation of solenoid LRS which is in series with step 0 of level 3. Such RPS is thereby actuated to effect shifting of the relay to step 1. Now, with regard to the steps of operation of relay Level 1 which follow, this is identical with that which has been described in the indexing of the distributor from Position A through Position E. In other words, just as the first stepping from step 0 to step 1 caused indexing of the distributor from Position A to Position B, this last stepping from step 0 to step 1 effects indexing of the distributor from Position E to Position D. The part which the cam lobes w and x play in this indexing is identical with that previously described for the cam lobes z and y.

Resuming the description, on step 1 the distributor is caused to index to Position D, the necessary interruption in operation of the motor 116 being effected by cam lobe w (FIGURE 13). It is now very significant to note that during this indexing to Position D a point p on the DB Cam operates switch-actuating cam follower 132 to open switches DB1b and DB2b and to close switches DB1a and DB2a. This in effect cuts out Levels 3 and 5 and cuts in Levels 2 and 4. The operation of the distributor pin cams in determining the sequence of pin distribution in positions D through A will then be taken over by Level 2 of the stepping relay.

Step 1 of Levels 2 and 4 (see FIGURE 19) effects the feeding of a pin off the end of the distributor and into the #2 bin pocket. This #2 pin effects shifting to step 2. On transition from step 1 to step 2 the Level 1 does not effect distributor indexing. With the distributor still in Position D the next pin is cammed off the right front of the distributor and into the #4 bin pocket. This #4 pin effects stepping to step 3.

On transition from step 2 to step 3 the relay Level 1 effects indexing of the distributor to Position C. Step 3 of Level 2 is dead and therefore the next pin proceeds off the end of the distributor and into the #1 bin pocket, which pin effects a shift to step 4.

On transition from step 3 to step 4 no distributor indexing occurs. On step 4 the relay Level 2 effects camming of a pin off the right rear of the distributor and into the #8 bin pocket. This #8 pin effects a shift to step 5.

On step 5 the distributor is indexed to Position B, and the next pin proceeds off the end of the distributor and into the #3 bin pocket because step 5 of Level 2 is dead. This #3 pin effects a shift to step 6.

On step 6 no distributor indexing occurs and the next pin is cammed off the left front of the distributor into the #6 bin pocket, and this #6 pin causes a shift to step 7.

On step 7 again no distributor indexing occurs and the next pin is cammed off the right front of the distributor into the #5 bin pocket. This #5 pin effects a shift to step 8.

On transition from step 7 to step 8 relay Level 1 causes indexing of the distributor to home position A and the next pin is cammed off the left rear of the distributor into the #10 bin pocket. The #10 pin causes a shift to step 9.

On step 9 no indexing occurs and the next pin is cammed off the right rear of the distributor into the #9 bin pocket. As the #9 pin leaves the distributor it is ready for the overtravel OTL at the left in FIGURE 19, which overtravel occurs upon a shift to step 10. Upon transition to step 10 motor 116 is caused to operate, and immediately thereupon the point s on OT Cam closes the switches OT1 and OT2. The description of a cycle of operation has now returned to the original starting point and has been completed.

It will be evident from the above description that the stepping relay included in FIGURE 16A comprises a means for programming the distribution of pins by the distributor to the #1 through #10 bin pockets. The sequencing of pin distribution during right-to-left and left-to-right distributor travel as described specifically above is only one of a variety of programs which can be used. Therefore, of course, it will be understood that the invention is not to be limited in scope to this specifically disclosed distribution scheme. The particular programming represented graphically by FIGURE 19, however, does have certain noteworthy advantages. One reason for this sequence is that, as will be noted from FIGURE 19, as the distributor indexes from one position to the next it travels in a direction away from a bin pocket in which the last pin was dropped. For example, when the distributor moves from Position D to Position E, the last pin that was distributed went to the #5 bin pocket and the indexing movement is in a direction away from the #5 bin pocket. The significance of this is that if for any unusual reason a pin dropped from the distributor does not properly settle in its assigned bin pocket, this pin will not be in the path of further distributor indexing movement so as to jam the machine. It may be noted further that with the exception of only the #4 pin during left-to-right travel and the #6 pin during right-to-left travel, the distributor does not cross over a delivered pin in the course of its indexing movement to the next position. A further reason for this sequence is that two successive pins never operate the pin switch actuator at the same side of the distributor. Therefore, any abnormal behavior of a pin tending to actuate the switch more than once will not—by falsely signalling the distribution of more pins than actually distributed—affect the control circuit because it is responsive only to the distribution of pins in a different sequence. An even further reason for this sequence is that, usually, a pin is delivered to a bin pocket which is located forwardly of the bin pocket to which the preceding pin was delivered. Thereby a time lag is introduced which assures the spacing of pins conveyed on the distributor. Finally, in order to allow ample time for a pin completely to leave the roller section extending from the end of the distributor following actuation of the front pin switch, the distributor is never indexed immediately to a new position.

As previously mentioned, the distributor according to the present invention is adapted to distribute pins to a receiver without regard to any particular aspects of control involving the receiver operation. Nevertheless, also as previously mentioned, it can have incorporated certain features specially adapted for distribution of pins to a receiver of the type represented by storage section IX. This part of the subject matter will now be described with reference additionally to FIGURES 16B, 17 and 18. The bin motor 150 is reversible, as shown conventionally in FIGURE 16B. A bin reverse relay BR has a set of normally closed contacts BRb and a set of normally open contacts BRc. When relay BR is de-energized and contacts BRb are closed the motor 150, if energized, will run in a "forward" direction, but upon energization of relay BR the closing of contacts BRc will cause running of motor 150 in a "reverse" direction. In operation the bin motor 150 is operated in a forward direction to invert the bin cups 146 and thereby drop pins into the table spotting cups 152, and is driven in the reverse direction to cause the bin cups to turn to an upright position in which they receive pins from the bin pockets #1 through #10. The running of bin motor 150, whether in a forward or reverse direction, is effected by a relay B having a first set of contacts Ba.

The distributor is caused to be operative responsively to the accumulation of pins in the storage section IX and, secondly, is caused to take part in control of the bin cup operation. In the first instance, the distributor cannot go into overtravel (OTL or OTR in FIGURE 2A) unless contacts TPRa are closed, but in the second instance the relays BR and B cannot be energized for reverse movement of the bin cups 146 to an upright position until the distributor has gone into overtravel.

In FIGURES 17 and 18 there are schematically illustrated a TP Cam and a BC Cam, both of which are operated in conjunction with the driving connection between the bin motor 150 and the ganged plurality of bin cups 146. In this illustration, the bin cups 146 and the TP and BC cams are rotated 180° in a clockwise direction in moving from the FIGURE 17 position to the FIGURE 18 position, and rotated 180° in a counterclockwise direction in return movement from the FIGURE 18 to the FIGURE 17 position. Thus it will be noticed that when the bin cups are in their inverted position (FIGURE 17) both of the cam-operated switches TP and BC are closed. When the bin cups 146 are in their upright position (FIGURE 18) both switches TP and BC are open. In the driving of the bin cups from an upright to an inverted position (to transfer pins to the spotting table II) as the bin cups approach the fully inverted position the TP Cam effects opening of switch TP. As will become evident hereafter, this causes de-energization of relay B and consequent interruption in the running of bin motor 150. In the driving of the bin cups from their inverted position back to their upright position (thereby to receive pins from the bin pockets) as the bin cups approach this fully upright position the BC Cam effects opening of switch BC. As will become evident hereafter, this also causes de-energization of relay B and consequent interruption in the running of bin motor 150.

The switch contacts TC are operated by a table cam, these contacts being closed as long as the table is in its upper position and open while the table is in the process of moving downwardly and thence upwardly to spot pins on the alley. Switch OT3 is operated by the OT cam in exactly the same timing and manner as the previously discussed switches OT1 and OT2. It will be noted that a line X leads from the switch OT1 to the circuit shown in FIGURE 16B. By means of this interconnection, when switch OT1 is closed the relays B, BR and TPR can be energized through the switch OT1.

The relay SP comprises that part of the Pinspotting Main Control Circuit which produces a demand signal indicating the need for pins in the pin-spotting cups or the like. Although the present controls are particularly adapted to operate in conjunction with the control circuit disclosed in the copending application of Roy E. Blewitt, Jr., Serial No. 195,927, entitled "Control Mechanism for Bowling Pin Spotting Machine" and filed May 18, 1962, the relay SP for indicating a demand condition can comprise a part of other types of control circuits. For example, the relay SP can be responsive to a pinspotting control circuit of the type disclosed in the Roger E. Dumas Patent 2,890,886, dated June 16, 1959.

In operation, following the distribution of ten pins to the storage section IX, if the bin cups 146 are in an inverted position (FIGURE 17), the distributor will be permitted to go into overtravel. The reason for this is that relay TPR will be energized through the closed cam switch TP, and therefore contacts TPRa will be closed to effect energization of distributor indexing relay DIR through step 10 of Level 1. As the distributor begins overtravel the switches OT1, OT2, and OT3 will be closed. Through line X, the closure of switch OT1 will effect energization of bin reverse relay BR, which will close contacts BRa as well as reversing of the bin motor 150 through closure of contacts BRc. With the combined closed conditions of overtravel switch OT3, of relay contacts BRa, of switch BC (due to the inverted condition of the bin cups as in FIGURE 17), and of relay contacts SPa (due to de-energization of relay SP), relay B will now be energized to effect the running of bin motor 150 in a direction to bring the bin cups 146 to an upright pin-receiving position. In the course of operation of bin motor 150 the switch TP will be permitted by the TP Cam to open, but relay TPR will be held in through closure of switch OT3 until the end of distributor overtravel. As the bin cups approach their fully upright position (FIGURE 18) the switch BC will be opened by the BC Cam to deenergize the relay B and thereby interrupt operation of the bin motor 150. Upon completion of overtravel the opening of switch OT3 will necessitate de-energization of relay TPR.

Following the completion of overtravel it is possible for the relay SP to effect the turning of bin cups 146 to the position wherein pins are deposited in the pinspotting cups. Upon a demand signal from the pinspotting main control circuit the relay SP is energized to close contacts SPb. With the table in its upper position and the relay TPR now de-energized, the contacts TC and TPRb will be closed to complete a circuit effecting enerization of relay B, which as previously explained causes forward operation of bin motor 150. As the bin cups return to an inverted position (FIGURE 17) the switch TP is closed to energize relay TPR, which in turn opens contacts TPRb to interrupt the circuit through relay B.

In the meantime, during which the relay SP may or may not have been energized to cause transfer of pins to the spotting table II, the distributor has proceeded in the distribution of another set of ten pins in the storage section IX. At the end of this further distribution the stepping relay again will shift to step 10, which normally would initiate overtravel of the distributor. If in the meantime, however, the bin cups have not been called upon to transfer pins from the storage section IX to the spotting table II, the originally distributed ten pins as well as the subsequently distributed set of ten pins are now present in the storage section IX. This presence of the originally distributed set of pins is indicated by the de-energization of relay TPR, for the bin cups are still in their upright position (FIGURE 18). Therefore, when this condition exists the distributor does not go into overtravel (because contacts TPRa are open) but is de-activated until pins are transferred to the spotting Table II in response to the spotting relay SP. After this occurs, however, the bin cups 146 will reverse back to their upright position to receive the remaining set of ten pins stored in the storage section IX. The reason for this is that as the bin cups are turned upside-down and switch TP is closed, the resultant energization of relay TPR will then permit the distributor to go into overtravel. During overtravel the closing of switches OT1 and OT3 will effect reversal of the bin cups 146 in the manner set forth above. Thereafter, the distributor will proceed with the distribution to storage section IX of a further set of ten pins.

The function of the contacts SPc should be noted, in that the distributor cannot proceed into overtravel at a time when the spotting relay SP is energized. Assuming that the bin cups 146 have just deposited a set of ten pins in the spotting cups, it is desired to prevent the immediate return of the bin cups to their upright position until the spotting of pins is completed or at least has been started. This end is accomplished by delaying distributor operation momentarily during spotting.

A further feature inherent in the circuit shown in FIGURE 16B involves the overload circuit breakers employed. At C there is indicated the coil of a relay which is normally energized to effect continued operation of a motor which drives the pit conveyor, pin elevator and ball return conveyor. At D there is indicated the coil of the relay which is normally energized to close the contacts Da in the circuit of distributor indexing motor 116. It will be noted that all of the relays C, D and B are in series with a pair of circuit breakers DMCB and BMCB. The circuit breaker DMCB is provided in the circuit associated with the power supply to the distributor motors 26 and 116, and therefore will open in the event of overload thereof. The circuit breaker BMCB is associated with the power supply for the bin motor 150, and therefore will open in the event of overload of this motor. Because the last two-mentioned circuit breakers are in series, the overload of either the distributor or the bin motor will prevent energization of the three relays C, D and B. The result will be that the entire back end of the machine will be shut down, including the motors for the distributor and the motors for the pit conveyor, pin elevator, ball return elevator and distributor. This is significant, for if a pin becomes jammed anywhere in the distributor or in the bin section IX, or in conjunction with both, damage to the machine will be prevented by this interruption in machine operation.

The pin distributor mechanism which has been described has numerous advantages such as those discussed in the introduction hereto. For example, in terms of performance the distributor can be made to deliver pins at a very rapid rate if necessary. The distributor has only one mode of movement bodily, namely, the swinging of the distributor in an arc across the top of the machine. The distributor need not be indexed following the delivery of every pin, but instead can deliver three or more pins per indexing stop. The distributor is of very simple mechanical construction affording a noticeable absence or mechanism to obstruct the receiver of pins, which in the disclosed machine is provided by a storage section IX. A primary factor is that by virtue of the simple arrangement of means effecting the delivery of pins from the distributor to the receiver, such means can be satisfactorily operated remotely. In accordance with the disclosed embodiment of the invention, such remote operation is accomplished by programming of the pin distribution sequence in an electrical control system.

It will be understood that various departures from the specifically disclosed embodiment of the invention can be effected without departing from the scope thereof as defined by the following claims.

What is claimed is:

1. In a bowling pinspotting machine having apparatus for elevating pins from the pit of a bowling alley and a horizontally oriented pin receiving and handling assembly including devices for the placement of pins on the alley; apparatus for distributing pins from said elevating apparatus to said assembly comprising a conveyor boom supported as a cantilever for free horizontal swinging movement back and forth above said assembly, means for effecting said movement of the conveyor boom, said conveyor boom receiving pins from said elevating apparatus and incorporating a pin conveyor driven in a direction to carry pins toward its distal end, a plurality of cam elements individually mouned on said conveyor for operation individually in the path of travel of conveyed pins to effect delivery thereof off the sides of the conveyor boom, and electrically driven means selectively operating said cam elements in sequence and in synchronism with progressive movement of the conveyor boom to selected pin distributing positions in accordance with a predetermined program of distribution .

2. In a bowling pinspotting machine having apparatus for elevating pins from the pit of a bowling alley and a horizontally oriented pin receiving and handling assembly including devices for the placement of pins on the alley; apparatus for distributing pins from said elevating apparatus to said assembly comprising a conveyor boom supported as a cantilever for free horizontal swinging movement back and forth above said assembly, means for effecting said movement of the conveyor boom, said conveyor boom receiving pins from said elevating apparatus and incorporating a pin conveyor driven in a direction to carry pins toward its distal end, a plurality of simple cam elements individually mounted on said conveyor boom, each of said cam elements being normally positioned below the pin conveying level of the conveyor boom and movable upwardly into the path of delivery of conveyed pins, a solenoid coupled to each of said cam elements for effecting said movement thereof upwardly, thereby to deflect a pin off the side of the conveyor boom at a certain point in the movement of the conveyor boom relative to said assembly, and electrical control means for programming the actuation of said solenoids in relation to said movement of the conveyor boom according to a predetermined program of pin distribution.

3. Article handling apparatus comprising in combination a substantially horizontal structure adapted to receive a plurality of articles and means for distributing a plurality of articles in succession to said receiving structure, said distributing means comprising: an elongated conveyor having endless belt conveying means, means supporting one end of said conveyor for horizontal movement of its free outer delivery end portion above said receiving structure, means driving said conveyor in a direction to convey articles toward and over said article receiving structure, means effecting said horizontal movement of the conveyor above said structure intermittently to successive indexing stations in relation to said article receiving structure, and control means for the last-mentioned means initiating indexing operation thereof in response to the discharge of a plurality of articles from said conveyor to said article receiving structure at some of said stations and to the delivery of only one article at other of said stations.

4. Article handling apparatus comprising in combination a substantially horizontal structure adapted to receive a plurality of articles and means for distributing a plurality of articles in successon to said receiving structure, said distributing means comprising: a generally elongated conveyor, means supporting said conveyor for movement of a distal article delivering end thereof across and in spaced structurally unconnected relation above said receiving structure, means for supplying articles to a receiving end of said conveyor, means driving said conveyor in a direction to convey articles in the direction of said distal end, a plurality of elements on said conveyor operably mounted individually for movement selectively into the path of article delivery, thereby to effect movement of articles off the sides of the conveyor, means operable to effect said movement of the conveyor across said receiving structure intermittently to successive indexing positions, means responsive to movement of the conveyor to one of said positions to initiate the operation of a selection of one or more of said elements in sequence, and means responsive to the delivery of pins to said receiving structure following operation of said elements to initiate operation of said conveyor moving means to index the conveyor to a different indexing position.

5. Article handling apparatus comprising in combination a substantially horizontal structure adapted to receive a plurality of articles and means for distributing a plurality of articles in succession to said receiving structure, said distributing means comprising: a conveyor, means supporting said conveyor for horizontal movement above said receiving structure, means supplying articles to said conveyor, means driving said conveyor in a direction to convey articles toward and over said article receiving structure, means for effecting said movement of the conveyor above the receiving structure, a plurality of elements on said conveyor mounted individually for movement into the path of travel of conveyed articles to effect delivery thereof from the sides of the conveyor to said article receiving structure, electrically driven means for operating said elements individually, and electrical means controlling the operation of said electrically driven means and thereby programming the sequence of article distribution in synchronized relation to said horizontal movement of the conveyor.

6. Article handling apparatus comprising in combination a substantially horizontal structure adapted to receive a plurality of articles and means for distributing a plurality of articles in succession to said receiving structure, said distributing means comprising: a conveyor, means supporting said conveyor for horizontal movement above said receiving structure, means for supplying articles to a receiving end of said conveyor, means driving said conveyor in a direction to convey articles over said article receiving structure, a plurality of elements on said conveyor mounted individually for movement selectively into the path of article delivery, thereby to effect movement of articles off the sides of the conveyor, electrically operated means provided individually for said elements and operable to effect such movement thereof, electrically controlled means for effecting said movement of the conveyor across the article receiving structure, and an electrical control circuit for driving said electrically operated means in a predetermined sequence according to a desired program of article distribution, said electrically controlled means being controlled by said circuit to move said conveyor in timed relation to the sequential operation of said elements.

7. Article handling apparatus comprising in combination a substantially horizontal structure adapted to receive a plurality of articles and means for distributing a plurality of articles in succession to said receiving structure, said distributing means comprising: a conveyor, means supporting said conveyor for horizontal movement of an outer delivery end portion thereof above said receiving structure, means supplying articles to said conveyor, means driving said conveyor in a direction to convey articles toward and over said article receiving structure, means for effecting said horizontal movement of the conveyor above said structure intermittently to successive indexing stations in relation to said article receiving structure, means operable to deflect articles from either side of said conveyor for delivery therefrom to said article receiving structure prior to their arrival at said end portion, whereby at each of said indexing stations a plurality of successively conveyed articles may be distributed in a sequence involving possible combinations of deliveries from one or both sides of the conveyor and/or from said end portion thereof, and means for coordinating the operation of the last-mentioned means and of said conveyor moving means, thereby to program the distribution of articles to different areas of said article reeceiving structure, including plural control steps and drive means serially activating said steps in time with the progression of article distribution, said steps being connected to said article deflecting means and each being adapted when activated to effect delivery of a particular article from the end or a side of the conveyor, as desired in accordance with said program, through control of said article displacing means, and only some of said steps being connected to said conveyor moving means and being effective when activated to initiate operation thereof for indexing of the conveyor to the next station.

8. Apparatus according to claim 7, wherein said article displacing means are electrically operated and said programming means comprise a stepping relay having its steps controlling the sequence of article distribution.

9. Article handling apparatus comprising in combination a substantially horizontal structure adapted to receive a plurality of articles and means for distributing a plurality of articles in succession to said receiving structure, said distributing means comprising: a conveyor, means supporting said conveyor for horizontal movement of the article delivery end thereof above said receiving structure, means for supplying articles to a receiving end of said conveyor, means driving said conveyor in a direction to convey articles toward said delivery end, a plurality of elements on said conveyor mounted individually for movement selectively into the path of article delivery, thereby to effect movement of articles off the sides of the conveyor, said delivery end of the conveyor being adapted to deliver an article to said receiving structure if none of said elements is so operated, a plurality of solenoids individually associated with and coupled to said elements for operation thereof, means for effecting said movement of the conveyor across said receiving structure, and electrical circuit means for controlling and energizing said solenoids to effect operation of said elements in a predetermined sequence synchronized with said horizontal conveyor movement according to a desired program of article distribution.

10. Apparatus according to claim 9, wherein said conveyor moving means is controlled by and responsive to said circuit to move the conveyor intermittently to successive indexing positions relative to the article receiving structure.

11. Apparatus according to claim 9, wherein said control means includes sequencing means comprising a number of serial steps, with each of a selected number of said steps being connected to one of said solenoids for operating its associated element, and means for advancing said sequencing means a step following the delivery of each article to said receiving structure by the action of said associated element.

12. Article handling apparatus comprising in combination a substantially horizontal structure adapted to receive a plurality of articles and means for distributing a plurality of articles in succession to said receiving structure, said distributing means comprising: a conveyor, means supporting said conveyor for horizontal movement above said receiving structure, means driving said conveyor in a direction to convey articles toward and over said article receiving structure, means supplying articles to said conveyor, means for effecting said horizontal movement of the conveyor above said article receiving structure, at least one cam element normally positioned below the article conveying level of the conveyor and movable upwardly into the path of delivery of conveyed articles, and means for moving said cam element upwardly to deflect an article off the side of the conveyor at a certain point in the movement of the conveyor relative to the article receiving structure.

13. Apparatus according to claim 12, including a plurality of said cam elements, and wherein the means for moving said cam elements comprise individual solenoids coupled thereto and an electrical circuit selectively controlling the energization of said solenoids.

14. Article handling apparatus compriisng in combination a substantially horizontal structure adapted to receive a plurality of articles and means for distributing a plurality of articles in succession to said receiving structure, said distributing means comprising: a conveyor boom having an outer article delivery end portion mounted for movement back and forth across said article receiving structure and incorporating an article conveyor driven toward said end portion, means for driving said conveyor boom horizontally in intermittent steps to index the boom from one article distributing position to the next, controllable means for effecting the removal of articles selectively from either the sides or the end of said conveyor boom for transfer to said article receiving structure, programming means establishing the number of articles to be delivered and their order of delivery from the sides and end of the conveyor boom at each of said article distributing positions, means responsive to said programming means when the conveyor boom is at any given position to operate said article removing means according to the number and order of delivery of pins programmed for distribution at said given position, means conditioned in response to indexing of the conveyor boom to each of said positions to sense the satisfactory completion of the programmed delivery of articles at that position, and means responsive to the last-mentioned means to operate said means for driving the conveyor boom to the next said article distributing position following said satisfactory completion of programmed delivery.

References Cited by the Examiner

UNITED STATES PATENTS

| | | | |
|---|---|---|---|
| 1,667,714 | 5/1928 | Bacheller | 198—31 |
| 1,855,421 | 4/1932 | Ross | 198—125 X |
| 2,781,195 | 2/1957 | Holloway et al. | 273—43 |
| 2,911,218 | 11/1959 | Scherzinger | 273—43 |
| 3,004,761 | 10/1961 | Congelli et al. | 273—43 |
| 3,018,103 | 1/1962 | Albrecht | 273—43 |

RICHARD C. PINKHAM, *Primary Examiner.*

DELBERT B. LOWE, *Examiner.*